United States Patent Office 3,514,336
Patented May 26, 1970

3,514,336
FUEL CELL COMPRISING AN ION-EXCHANGE MEMBRANE HAVING ELECTROLYTE CHANNELS THEREIN
Jose D. Giner, Sudbury, Mass., and Kurt S. Spiegler, Berkeley, Calif., assignors, by mesne assignments, to Leesona Corporation, Warwick, R.I., a corporation of Massachusetts
No Drawing. Filed Oct. 4, 1965, Ser. No. 492,855
Int. Cl. H01m 27/00
U.S. Cl. 136—86                 4 Claims

ABSTRACT OF THE DISCLOSURE

An electrochemical cell for the direct generation of electrical energy is described which utilizes an ion-exchange resin matrix having macro-porous channels containing a free aqueous electrolyte in the channels.

---

This invention relates to matrices for retaining an electrolyte in an electrochemical cell; to the process of producing such matrices and to the electrochemical cell employing the matrices. More particularly, the invention embraces ion-exchange resin matrices having porous openings therein, permitting the impregnation of the membrane with a fluid electrolyte. For convenience, the invention will be described hereinafter with emphasis being placed on the use of the novel electrolyte matrices in a fuel cell. It will be apparent, however, that the structures described can be employed in other electrochemical devices where similar considerations apply.

In a fuel cell, the current provided is in part limited by the rate of diffusion of ions through the electrolyte of the cell to the electrode surfaces. In the very early fuel cell art emphasis was placed on fuel cells employing solid ionic electrolytes. However, more recently, in view of the problems encountered with fuel cells using solid electrolytes, such as the difficulty of bringing the temperature of the cell up to, and thereafter, maintaining the cell at the relatively high temperature needed for effective ionic conductance, aqueous electrolytes which are ionic conductive at lower temperatures were suggested. The aqueous electrolytes have been employed as free-flowing electrolytes or trapped in a suitable inert porous carrier. Although having the electrolytes trapped in an inert porous carrier has advantages over free-flowing electrolytes in that the matrix helps support the normally delicate electrodes of the cell, it became apparent that when a current passes through the cells, concentration polarization occurs, i.e., the composition of the matrices at the regions in the vicinity of the electrodes is different from the bulk electrolyte. Although electrolyte diffusion counteracts the aforesaid effect to a certain extent, the concentration polarization nevertheless causes increased internal resistance and power loss. Moreover, there is a gradient of the water concentration across the cell.

As a possible solution to the aforesaid problem, the use of ion-exchange resin membranes as the sole electrolyte in a fuel cell was suggested. In such cells, the electronic conductivity of the membrane is negligible. However, the ionic conductivity of the membrane is high. Moreover, the membranes are selectively permeable to one type of ion depending on the membrane employed while resisting the passage of uncharged gases or ions of opposite charge. Furthermore, the ion-exchange resin membranes having high structural strength, contribute to the mechanical integrity of the fuel cell.

Although the ion-exchange resin membranes of the fuel cell eliminate certain problems encountered with trapped electrolytes in an inert matrix as the sole electrolyte, certain other problems and disadvantages occur. For example, when an ion-exchange membrane is used as the sole electrolyte, a disproportionate water transfer occurs during operation of the cell which tends to dry one membrane face with respect to the other. The water transfer which is inherently associated with ion transport results from two causes: (1) since all ions are more or less hydrated, water transport is inherent in the transfer of ions; and (2) since the membrane contains a fixed charge, there is an endosmotic water transfer under the influence of an imposed DC potential across the membrane. The drying of the membrane, due to water transfer, causes an increase in ohmic resistance and mechanical shrinkage which eventually cracks and permanently damages the membrane.

In order to overcome the aforesaid difficulties in fuel cells employing ion-exchange resin membranes as the sole electrolyte, elaborate wicking arrangements have been suggested as a means of re-distributing the water and causing an even wetting of the membranes. However, as is apparent, such means substantially increase the cost and complexity of any fuel cell as well as increase the ohmic resistance of the cell. As a further solution to the problem, it has been suggested that a reservoir of water be maintained between ion-exchange membranes which are in contact with the face of both the cathode and anode of the cell. Although the latter expediency does eliminate the dehydration problem, the use of the free-flowing liquid defeats one of the attractive features of ion-exchange resin membrane electrolytes.

Accordingly, it is an object of the present invention to provide a fuel cell electrolyte matrix comprising the advantages of an ion-exchange resin membrane electrolyte with the advantages of an electrolyte trapped in an inert porous material, which matrix does not possess the inherent problems of uneven drying of the membrane or concentration polarization.

The above, and other objects of the invention will be more apparent from the following detailed description with particular emphasis being placed on the illustrative example.

The objects of the present invention are accomplished by constructing electrolyte ion-exchange resin matrices which are porous enabling a fluid electrolyte to be retained therein. These matrices can be generically classed as (1) macroreticular ion-exchange membranes; (2) ion-exchange matrices having vertical channels for retaining a liquid electrolyte; and (3) granular ion-exchange resin beds with porous spaces filled with electrolyte solutions. These structures are substantially different from the ion-exchange membranes conventionally employed in fuel cells which are homogeneous gels of the ion-exchange resins. The present matrices are truly macro-porous structures similar to those of conventional adsorbants such as alumina and bone char. A fluid electrolyte can flow through the pores of the matrices. Furthermore, the structures are different from the inert porous carriers in that part of the conductance is due to the counter ions of the ion-exchange membranes, with only a part of the conductance being a result of the soluble electrolyte in the matrix pores.

According to the invention, macroreticular ion-exchange resin matrices are formed by sintering resin beads having ion-exchange properties at a temperature sufficient to obtain bonding of the resin beads. For example, resin beads having a surface area of about 40 to 60 square meters per gram when sintered will provide a macroreticulated membrane having a pore diameter of from about 200 to 600 angstroms. Further, ion-exchange resin matrices having a substantially uniform pore structure can be prepared by admixing particles of ion-exchange materials with a combustible substance, such as cellulose fibers, ammonium carbonate and the like, compressing the admixture to obtain a matrix of the desired dimension, and thereafter removing the combustible material by heating at a temperature elevated sufficiently to obtain bonding of the ion-exchange materials and burning of the combustible material, thereby leaving voids in the area previously occupied by the combustible substances. Moreveor, rather than removing the pore forming materials by heat, it is possible to employ substances which are chemically sensitive and which can be leached from the membrane by chemical action. For example, the ion-exchange resin can be admixed with aluminum particles, a matrix formed and the aluminum thereafter removed by leaching with a chemical agent such as sodium hydroxide.

Moreover it is possible to make ion-exchange matrices with cylindrical channels orientated parallel to the matrix face by pressing an ion-exchange resin around fibrous or other removable materials in parallel orientation and thereafter removing the materials. The resultant matrices can be employed between electrodes in a fuel cell and an electrolyte solution pumped through the channels.

When the structures of the present invention are used in a fuel cell, the matrix will act as mixed current carriers, part of the conductance being due to counter-ions and the remainder to ions of the soluble electrolyte. Since the current is carried by both counter ions of the soluble electrolyte, appreciable pressure gradients across the membranes do not develop since the permeability is relatively high. Hence, the resins cannot dehydrate as a result of endosmotic transport and the electrolyte remains homogeneous.

The ion-exchange materials employed in the present invention are those known in the art. These resins include in their polymeric structure the dissociable ionizable radicals, one ionic component of which is fixed or retained by the polymeric matrix with at least one ion component being a mobile and replaceable ion electrostatically associate with the fixed component. The ability of the mobile ion to be replaced under the appropriate conditions by other ions imparts ion-exchange characteristics to these materials.

The aforesaid resins are prepared by co-polymerizing a mixture of ingredients, one of which contains an ionic constituent. Cation exchange resins which depend upon a carboxyl group for their activity are prepared by forming insoluble polymers, co-polymers, or hetero-polymers of an unsaturated carboxyl containing compound or the equivalent thereof. Polymerization can be carried out in bulk, solution, or in emulsion form. If the starting materials are carboxylic acids, the functional groups of the acid are obtained in the acid form. If an acid anhydride is used, acid groups are readily formed by reaction of the resin with water. Ester groups can be hydrolyzed or saponified to yield resins with free carboxylic groups. Salt froms can be converted to the carboxyl forms by treatment of the resin in the salt form with an acid solution. A specific type of a carboxylic exchanger is prepared by hetero-polymerizing maleic anhydride or fumaric acid with styrene together with a cross-linking agent such as divinylbenzene. Other particularly useful starting materials for preparing carboxylic resins are acrylic acid and methacrylic acid. If these materials are polymerized into an insoluble form, the resulting products are of high capacity. The aforesaid acids may also be co-polymerized with polyunsaturated polymerizable compounds such as divinylbenzene, trivinylbenzene, ethylene diacrylate, or dimethylacrylate, diallyl maleate or fumarate to yield insoluble carboxylic resins effective as cation exchangers. Additionally, phenolic sulfonic acid, polystyrene sulfonic acid, or polystyrene sulfonic acid containing activated hydroxyl groups can be used in the preparation of cation exchange resins.

Anion exchange resins comprise an ionic group which is basic in nature. Such groups include amino groups, quaternary ammonium hydroxide, the guanidine group, the dicyandiamidine group and other nitrogen containing basic groups. In the ion-exchange resins, the ionizable group is attached to a polymeric compound such as phenolformaldehyde resin, a polystyrene-divinylbenzene copolymer, a ureaformaldehyde resin, a melamine formaldehyde resin, or the like. A typical anion exchange resin may be prepared by copolymerizing a mixture of phenol, formaldehyde, and triethylenetramine. These resins are well known and are described in the chemical literature.

As a result of the manner in which the resins are prepared, they preferably will contain substantial amounts of water which increases the ionic conductivity of the resins. Thus, the resin is said to be hydrated which means that the resin contains enough water to substantially saturate the resin, but not enough to keep the resin wet. Although the amount of water in the hydrated resin may vary, within fairly wide limits depending upon the particular composition of the resin and its physical structure, it has been found that the resin should contain from about 15 to 50 percent by weight of water.

The matrices of the present invention can be used in a fuel cell with any of the commonly employed aqueous electrolytes. Exemplary materials are aqueous solutions of the alkali hydroxides, alkaline earth hydroxides and carbonates, and the strong acids such as hydrochloride, sulphuric and phosphoric acids. Additionally, other aqueous solutions can be selected as long as they remain invariant or substantially invariant under the operating conditions of the cell. Furthermore, the cells can be operated with either air or oxygen as the oxidant with any of the prior art fuels including hydrogen, ammonium, carbon monoxide, methanol, ethane, and propane. The particular electrolyte, fuel and oxidant employed does not form a part of the instant invention with the proper selection of the aforesaid materials being within the ability of one skilled in the art.

The fuel cells employing the presently described matrices can also employ conventional electrodes. However, it has been found that the porous lightweight electrodes comprising a conductive support coated with a uniform layer of catalytic metal and hydrophobic polymer binder are particularly desirable. The matrix helps support the electrodes, permitting the construction of very thin, compact fuel cells. Furthermore, sandwich-type electrodes which have a catalytic layer positioned between a hydrophobic membrane on the gas side and a hydrophilic membrane on the electrolyte side can be used as well as nonporous hydrogen diffusion electrodes of the type described in Oswin U.S. Pat. No. 3,092,517.

Although the cells employing the novel matrix can be operated at various temperatures, one practical advantage of a cell employing ion-exchange membrane electrolytes is their ability to operate at low temperatures. Thus, preferably, the present cell will operate at a temperature of from about 20 to 150° C. However, higher temperatures, ranging up to about 350° C., can be employed. When the higher temperatures are used, however, it will be necessary to select a resin which will withstand such conditions.

Having described the invention in general terms, the following example will more particularly illustrate the invention.

EXAMPLE

A macro-porous matrix was prepared by placing a cation-exchange resin in bead form having a specific surface area of 40 to 60 square meters per gram of dry resin in a suitable mold and applying light pressure. The ion-exchange resin under pressure was heated at a temperature of 130° C. in order to obtain bonding of the resin beads at their peripheries. After cooling, the resin was removed from the mold. The matrix was a macroreticular ion-exchange membrane having pore diameters ranging from 200 to 600 angstroms with the average pore diameter being 350 angstroms. The ion-exchange beads comprised a 95 percent styrene and 5 percent divinylbenzene co-polymer which had been chloromethylated with chloromethyl ether. The chloromethylated product was then aminated with trimethyl amine to form the corresponding quaternary ammonium chloride.

The matrix was disposed of in a fuel cell between two lightweight electrodes which comprised a 50 mesh nickel screen coated on each surface with an admixture of platinum black and polytetrafluoroethylene. The structure was heated sufficiently to bond the polytetrafluoroethylene particles to each other and to the nickel screen. The electrode contained 18 milligrams platinum per square centimeter and 10 milligrams polytetrafluoroethylene per square centimeter. The matrix was flooded with a 28 percent aqueous solution of KOH. The fuel cell, when operated at 60° C. and the anode fed with hydrogen and the cathode fed with air, provided a current density of 150 ma./cm.$^2$ at 0.85 volt.

As will be apparent to one skilled in the art, the aforesaid example is only set forth as a preferred embodiment of the invention. However, the invention is not to be construed as limited thereby. It is possible to produce still other embodiments without departing from the inventive concept herein described and such embodiments are within the ability of one skilled in the art. These embodiments are intended to be covered by the appended claims.

What is claimed is:
1. In an electrochemical cell for the direct generation of electrical energy comprising an anode, a cathode and an electrolyte the improvement wherein the electrolyte comprises an ion-exchange resin matrix having macroporous channels oriented parallel to the matrix face, and means for circulating an aqueous electrolyte in said channels.

2. The cell of claim 1 wherein the aqueous electrolyte is in aqueous alkali hydroxide.

3. The cell of claim 1 wherein at least one of said anode and cathode is a lightweight structure comprising a uniform admixture of a catalytic metal and a hydrophobic polymer.

4. The cell of claim 3 wherein the hydrophobic polymer is polytetrafluoroethylene.

References Cited
UNITED STATES PATENTS

| | | |
|---|---|---|
| 3,297,484 | 1/1967 | Niedrach. |
| 3,216,882 | 11/1965 | Feldt et al. _____ 260—2.5 |
| 3,276,910 | 10/1966 | Grasselli et al. _____ 136—86 |

WINSTON A. DOUGLAS, Primary Examiner

H. A. FEELEY, Assistant Examiner

U.S. Cl. X.R.

136—153